March 31, 1964 F. R. DICKEY, JR 3,127,607
METHOD AND APPARATUS FOR RECORDING OF RADAR SIGNALS
Filed Sept. 29, 1960 3 Sheets-Sheet 1

INVENTOR:
FRANK R. DICKEY JR.,
BY *Marvin Goldenberg*
HIS ATTORNEY.

March 31, 1964     F. R. DICKEY, JR     3,127,607
METHOD AND APPARATUS FOR RECORDING OF RADAR SIGNALS
Filed Sept. 29, 1960     3 Sheets-Sheet 2
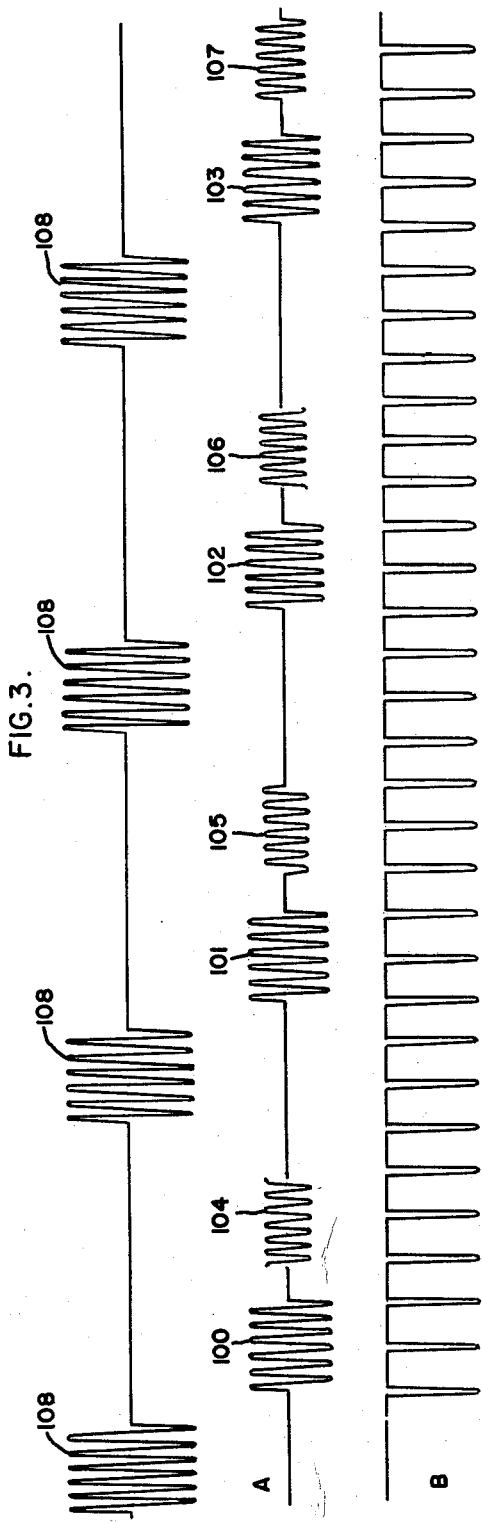
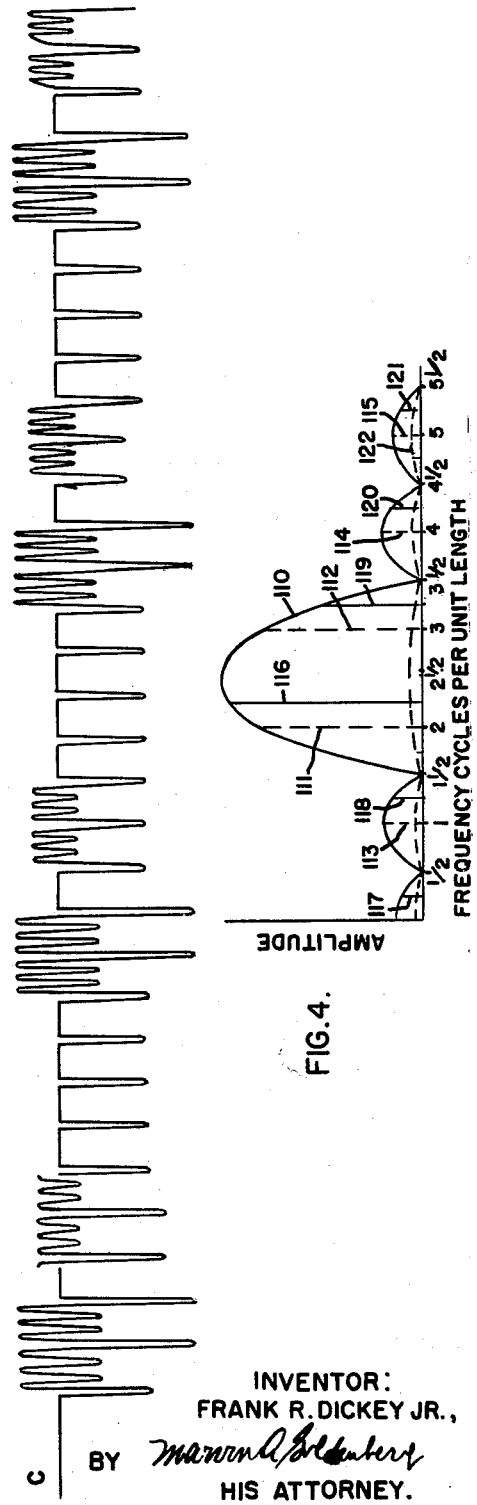
INVENTOR:
FRANK R. DICKEY JR.,
BY
HIS ATTORNEY.

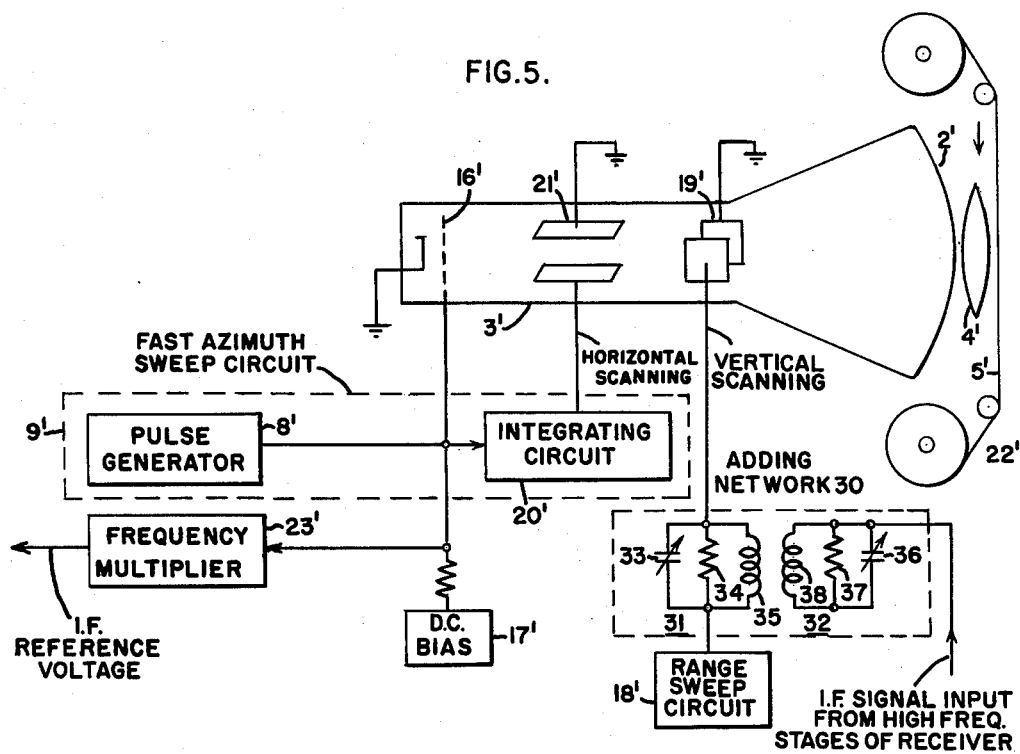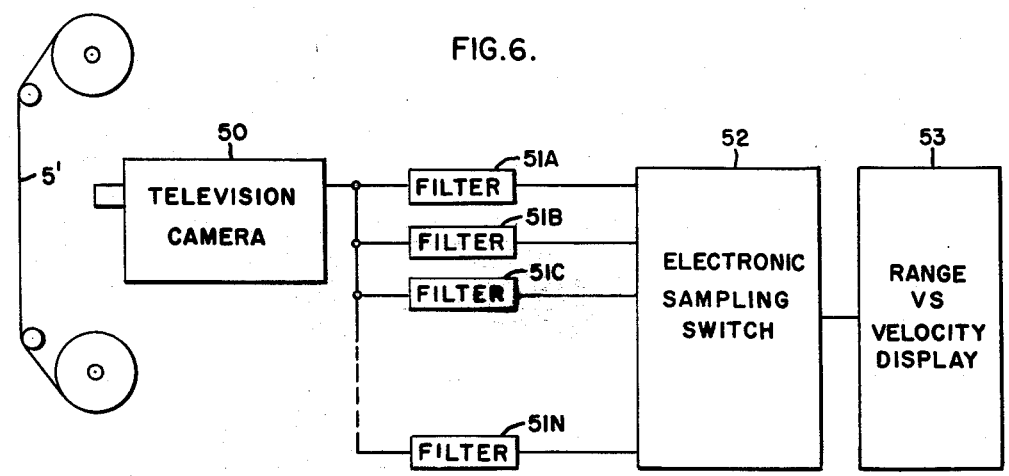

United States Patent Office 3,127,607
Patented Mar. 31, 1964

3,127,607
METHOD AND APPARATUS FOR RECORDING
OF RADAR SIGNALS
Frank R. Dickey, Jr., Dewitt, N.Y., assignor to General
Electric Company, a corporation of New York
Filed Sept. 29, 1960, Ser. No. 59,336
11 Claims. (Cl. 343—17.1)

The present invention relates to the recording of received target information signals in radar systems, and more particularly to improved methods and apparatus for recording the phase and amplitude of such signals so as to preserve an increasd amount of Doppler frequency information in the recorded waveforms thereof for subsequent spectral analysis.

A number of techniques exist in the prior radar art for recording the signal returns from distant targets, where the recordings may be subsequently analyzed for Doppler frequency components. Among these are included a photographic technique in which the received signals are first displayed by a high resolution cathode ray tube having a short persistency phosphor and then stored on photographic film. The type of display employed is comparable to that used in conventional radar range-azimuth or "B" scope display devices. The film is positioned in front of the tube and exposed to the light appearing on the screen, thus recording the waveforms impressed onto the screen. In lieu of photographic film, thermoplastic film may be employed wherein the film is mounted within the evacuated chamber of the tube and the electron beam caused to impinge upon the thermoplastic. A detailed disclosure of thermoplastic recording is presented in an application for U.S. Letters Patent No. 8,842, entitled "Method, Apparatus and Medium for Recording," filed February 15, 1960, by William E. Glenn, and assigned to the present assignee.

In another known technique, recording storage tubes are employed in which the received information signals are capacitively stored, and the stored information subsequently read out as an electrical signal. The recorded information in these various techniques may be subjected to either an electrical or optical spectral analysis of the frequency components for the derivation of Doppler frequency data.

In the prior art, in both the display and recording of radar signals, the received RF signals or IF signals are converted to video pulses by beating with an intermediate frequency reference oscillator before being applied to the cathode ray tube of the display system. Thus, the signals are displayed and/or recorded in video form in which the retained target information, and particularly with reference to moving targets, is somewhat limited.

Moving targets are normally identified by a shift in received frequency of the RF pulses from that of the transmitted frequency, identified as the Doppler frequency shift. The Doppler frequency shift appears in the video waveforms as an amplitude modulation of the video pulses. Although the Doppler frequency information is partially preserved in this amplitude modulation, much of the information is not. Thus, the meaningful range of frequency content in the stored data is limited, so that Doppler frequency shifts in excess of one half the transmitted pulse repetition frequency cannot be recognized. In addition, the ability to distinguish the sign of the frequency shift with respect to the reference oscillator is limited. Furthermore, only a component rather than the full amplitude of the received signals is retained. It is the purpose of this invention to provide a recording system which preserves much of this lost information.

Accordingly, one object of the invention is to provide improved methods and apparatus for accurately recording the phase and amplitude of received radar signals.

It is another object of the invention to provide improved methods and apparatus for recording the phase and amplitude of received radar signals so as to increase the Doppler frequency information from moving targets that can be obtained from said signals.

A more specific object of the invention is to provide a recording system in which radar signals are recorded at the intermediate frequency so as to increase the range in which Doppler frequencies can be readily identified in a subsequent spectral analysis.

Another specific object of the invention is to provide a recording system in which radar signals are recorded at the intermediate frequency so as to increase the range in which the sign of Doppler frequency shifts can be determined in a subsequent spectral analysis.

In accordance with one aspect of the invention, radar target signals at the intermediate frequency are recorded by being applied to the control electrode of a high resolution cathode ray tube having a short persistency phosphor screen. Said signals intensity modulate the electron beam of the tube. The cathode ray tube comprises first and second electrode pairs or deflecting coils for causing said electron beam to describe a relatively narrow rectangular raster of parallel scanning lines on the screen. A sawtooth voltage from a range sweep circuit is applied to the first pair of electrodes for sweeping the electron beam in the vertical, or range, direction at a sweep frequency equal to the pulse repetition frequency (PRF) of the target signals. A second sawtooth voltage is applied to the scond pair of electrodes for rapidly sweeping the beam in the horizontal, or azimuth, direction at a fast sweep frequency equal to a submultiple, typically one third, of said intermediate frequency. The resulting light from the narrow raster on the screen is focused upon a portion of a photographic film storage medium which is positioned adjacent to said screen. The photographic film is transported in the azimuth direction at a rate which is slow compared to the velocity involved in the range sweep. Thus, the complete target information from successive transmitted pulses is impressed on the photographic film by successive range sweeps recorded side by side wherein during each range sweep there are described many azimuth scanning lines, e.g., 1000. The individual target pulses are recorded as several cycles of IF on said azimuth scanning lines at the respective target range positions. Successive intermediate frequency pulses from individual targets are in this manner aligned in the azimuth direction so as to form essentially continuous waveforms. The Doppler frequency information of the moving targets is recorded in the phase shift of the intermediate frequency component of said successive target pulses. This phase shift information is readily recovered by subsequent spectral analysis of the recorded waveform.

In accordance with another aspect of the invention, the intermediate frequency target signals are added to the sawtooth voltage from the range sweep circuit and are applied to the vertical deflecting electrodes of the tube to velocity modulate the electron beam. The recorded waveforms appear as in the intensity modulation embodiment.

In accordance with a further aspect of the invention, the target signals are stored on a thermoplastic film mounted within the evacuated chamber of the cathode ray tube, the electron beam impinging upon and deforming the thermoplastis material, thereby storing the target information as a thickness modulation of the tape.

In accordance with still a further aspect of the invention, an image storage tube is employed for electrically storing the target information within the tube, storage being effected by capacitor plates. In this type of recording, the second, slow azimuth sweep is provided by an additional sawtooth signal applied to the horizontal deflecting structure.

The invention will be better understood from the following description taken in connection with the accompanying drawings while the novel and distinct features of the invention are particularly pointed out in the appended claims.

FIGURE 3 is a series of graphs illustrating the voltage waveforms at various points in FIGURE 1;

FIGURE 4 is a graph illustrating the spectrum corresponding to the recorded waveforms shown in FIGURE 2;

FIGURE 5 is a schematic diagram of a second embodiment of applicant's invention; and FIGURE 6 is a schematic diagram of a typical electrical readout system which may be employed to provide a spectral analysis of the recorded waveforms obtained by the circuits of FIGURES 1 and 5.

Figure 1:
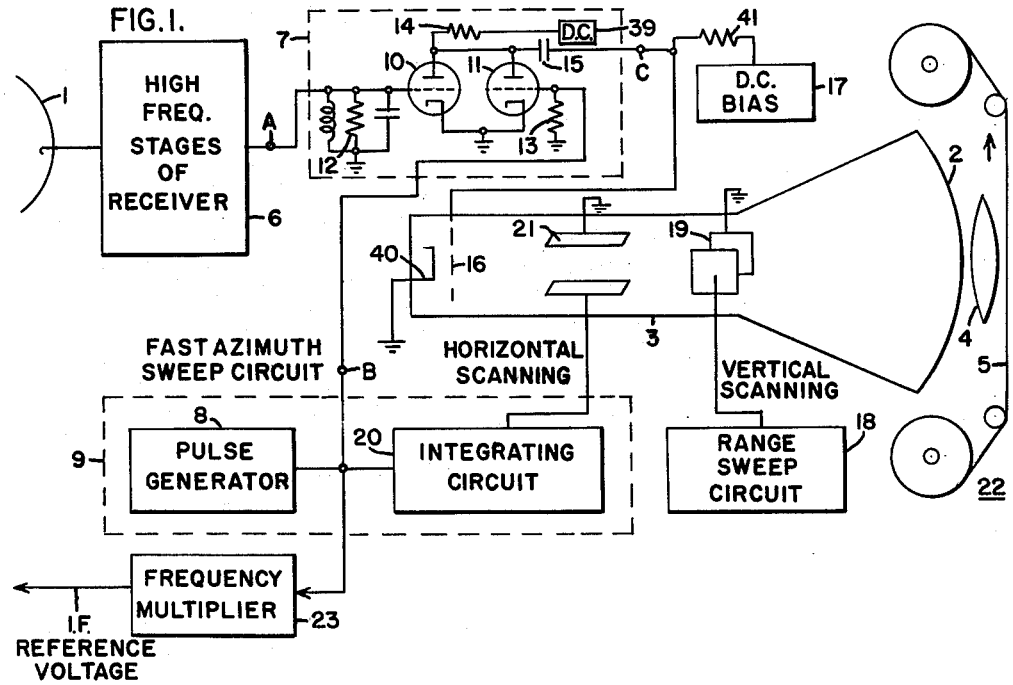
FIGURE 1 is a schematic diagram of one embodiment of applicant's invention.
Figure 2:
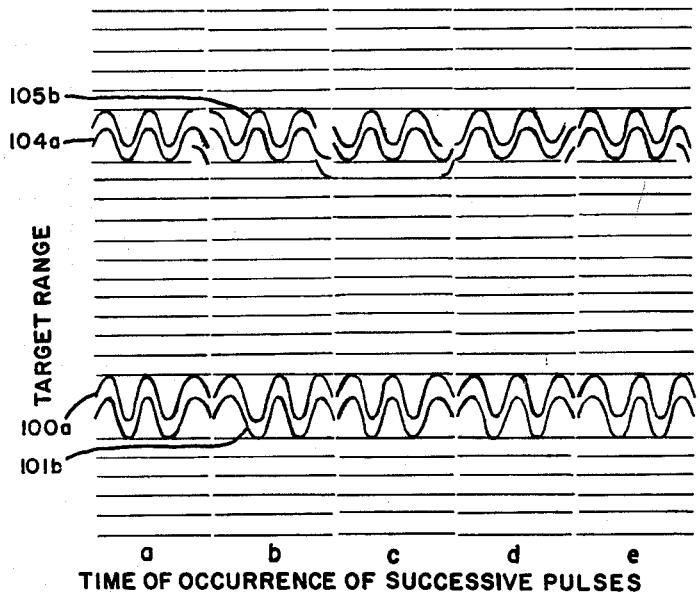
FIGURE 2 is a graphical illustration of a magnified portion of the recorded waveforms in the system of FIGURE 1.

Referring to FIGURE 1 of the drawings, there is shown radar receiving equipment employing one embodiment of applicant's IF recording apparatus. In the equipment illustrated, the RF information signals reflected from distant targets, in the form of repetitive randomly spaced pulses, are received at the antenna 1, and after being converted to an IF frequency are displayed in their IF form on the phosphor screen 2 of cathode ray tube 3, shown in plan view. Cathode ray tube 3 is preferably of the kind characterized by small spot size, brightness and a short persistence phosphor, e.g., type Z 4665 P11, manufactured by General Electric Company. The image displayed on the screen 2 is focused by lens 4 so as to expose a photographic film 5, the image thereby being permanently recorded by the film. The recorded information forms a raster on the film 5, a blown up portion of which is graphically illustrated in FIGURE 2, wherein the ordinate axis corresponds to the echo time of transmitted pulses or target range and the abscissa axis corresponds to the time of occurrence of successive pulses or target azimuth. In the drawing of FIGURE 2, the alternating waveforms represent the magnitudes of the charge densities deposited by the electron beam, when modulated by the IF target pulses, along the scanning lines, which are also the light intensity functions appearing on the film resulting from said charge densities. These waveforms will be discussed in detail presently.

The received RF signals may be considered as forming a plurality of pulse trains wherein each RF pulse is a reflected target return signal positioned in time in accordance with the target range. Each train comprises the pulsed signals from a single target. The signals are fed from antenna 1 to the high frequency stages of the receiver, contained in block 6, which include a conventional RF amplifier, frequency converter and IF amplifier. The IF signals from the output of the IF amplifiers are supplied to adding network 7, in which they are added to a voltage from the output of pulse generator 8, contained in a fast azimuth sweep circuit 9. The latter voltage consists of negative D.-C. pulses of considerably greater amplitude than the IF signals, having a duration preferably equal to the time of a half cycle of the IF frequency, which is typically 60 mc., and a frequency which is precisely a submultiple of the IF frequency, e.g., one third. The negative pulses, when added to the IF signal, provide periodic cut off of the beam. In addition, they are employed to provide a fast azimuth sweep of the beam in cathode ray tube 3, as will be presently explained. Pulse generator 8 may take the form of a vacuum tube blocking oscillator employing a tube such as a 2C39 having a low capacitance and large current handling ability.

The adding network 7 may take the form of a pair of amplifier tubes 10 and 11, operated class A, the cathodes of which are connected to a common ground and the anodes of which are commonly connected to the junction of load resistor 14 and a coupling capacitor 15. The opposite terminals of resistor 14 and capacitor 15 are connected respectively to a voltage source 39 and to the grid 16 of cathode ray tube 3. The IF signal is connected to the grid of tube 10 by a parallel resonant circuit 12, which is tuned to the IF frequency. The signal from pulse generator 8 is connected across a low input impedance resistor 13 to the grid of tube 11. The output summation signal of the two input signals appears across load resistor 14 and is connected by coupling capacitor 15 to the grid 16. A D.-C. bias source 17 is connected by resistor 41 to grid 16 to provide a fixed bias thereto. Said summation signal intensity modulates the electron beam in accordance with the signal information, while causing periodic cut off of the beam during the flyback time of the fast azimuth sweep.

The cathode ray tube 3 is shown to comprise only that structure required to adequately describe the invention, including the electron beam emitting cathode 40, control grid 16, screen 2, a pair of vertical deflecting electrodes 19 and a pair of horizontal deflecting electrodes 21. The electron beam is deflected in the vertical direction by the range sweep circuit 18. Circuit 18 is of conventional form, including a pulse generator and integrator for generating a sawtooth waveform at a frequency of the transmitted pulse repetition frequency (PRF) which is connected to the vertical deflecting electrodes 19, the tube 3 being shown in plan view. The beam is deflected rapidly by the fast azimuth sweep voltage from circuit 9 in the horizontal direction across a narrow vertical segment of the screen as the beam is being swept vertically. The length of the fast azimuth sweep is in the order of six thousandths of an inch. The fast azimuth sweep circuit includes the pulse generator 8 and an integrating circuit 20. The pulses from generator 8 are supplied to the integrating circuit 20 in which they are transformed into a sawtooth voltage at the frequency of pulse generator 8, which voltage is connected to the horizontal deflecting electrode 21. The beam spot thus scans a sawtooth path, the beam being cut off during the flyback portion so as to describe a succession of parallel lines, in the order of 1000, in a manner illustrated in each of the vertical segments or columns a to e of FIGURE 2. It is noted, however, that the diameter of the spot is made greater than the spacing between the azimuth scanning lines, the spot diameter being typically 1 mil and the between line spacing somewhat less, so that the azimuth lines that are written by the beam actually are found to overlap. The reason for the overlap will be discussed presently.

A slow azimuth sweep of indefinite length is provided by a continuous movement of the film 5 by the film transport mechanism 22 in the direction indicated by the arrow in FIGURE 1, which permits the photographing of vertical segments appearing successively in time on the screen 2. The transport speed is at a rate which moves the film a distance equal to the width of a single vertical segment, e.g., .006 inch, during the interpulse period of the transmitted pulses.

The pulse generator 8 may also be employed to provide a sinusoidal IF reference voltage to be employed in a conventional radar heterodyning arrangement so as to produce a precise frequency difference between the local oscillator frequency and the transmitted frequency, thereby providing a stable IF in the receiver that is precisely related to the fast azimuth sweep frequency. Thus, the output of the pulse generator 8 is connected through frequency multiplier 23 which increases the frequency by a factor equal to the desired ratio of the IF frequency to the pulse generator frequency. Frequency multiplier 23 may comprise conventional frequency multiplier circuitry, or may consist of a selective amplifier tuned to the desired harmonic frequency equal to the IF.

In the operation of the device of FIGURE 1, RF pulses having been transmitted at a fixed PRF by a conventional radar transmitter, not shown, are returned from fixed and moving targets to the antenna 1. After mixing in the high frequency portion of the receiver 6, they appear at point A as coherent IF signals in the form of pulse trains. The term "coherent" is well known in the radar art and it implies that the phase of the received signals with respect to a reference oscillator is either constant (for signals reflected from fixed targets) or varies by a regular amount (for signals reflected from moving targets). As shown in graph A of FIGURE 3, these IF pulse trains comprise fixed target information from a single target, indicated by pulses 100, 101, 102 and 103, and moving target information from a single target, indicated by pulses 104, 105, 106 and 107, each pulse including six cycles of the IF. These pulses are plotted in the time domain and are displaced from the transmitted pulses 108 of graph 1, which are illustrated in IF form for consistency in illustration. The duration of the transmitted pulses is in the order of a tenth of a microsecond. The transmitted pulses are spaced approximately 1 millisecond apart which is sufficiently close in time so that with the transmitting antenna being scanned or held stationary as in some applications, a large number of signal returns, at least in the order of 50 to 100, are derived from a single target. It is noted that the fixed target IF waveforms 100 to 103, derived from successive transmitted pulses, are essentially identical in phase and amplitude, which is characteristic of fixed target information. On the other hand, the moving target waveforms 104 to 107 are of essentially equal amplitude but successively shifted in phase, indicative of the Doppler frequency shift. In this instance, the phase shift between successive waveforms is seen to be 90°, denoting a Doppler frequency of one quarter the transmitted PRF.

The pulsed waveform at the output of pulse generator 8 appears at point B as a succession of negative D.-C. pulses, as illustrated in graph B of FIGURE 3. These D.-C. pulses when added to the IF signal of point A appear at the output of the adding network 7, at point C, with the D.-C. pulses superimposed on the IF signal, as shown in graph C of FIGURE 3.

With no IF signal present, the uniform bias applied to the grid 16 from bias source 17 causes the beam to write uniformly as it is deflected in the vertical and horizontal directions by electrode pairs 19 and 21, thus illuminating the screen 2 at a gray level. When the IF signals appearing at point C are applied to the grid 16, an intensity modulation of the beam above and below said uniform bias level occurs. The net effect is to write a few IF cycles per target pulse in the azimuth direction as well as to position the pulse writing in range. For a given ratio of fast azimuth sweep frequency to IF frequency of one to three, and with a flyback time equal to a half cycle of the IF, it may be seen that two and a half cycles of the IF of each target pulse will be written upon an azimuth line in each vertical segment appearing on the screen. Since each target pulse is considered to contain six cycles of the IF, each pulse will be indicated upon the screen as an intensity modulation of two or three adjacent azimuth lines, which appear on the film 5 as shown in FIGURE 2.

Referring now to the recording illustrated in FIGURE 2, target range, or echo time, is indicated in the direction of the film width, target azimuth, or the time of occurrence of successive pulses, along the longitudinal dimension of the film, and target velocity, or Doppler frequency, is in terms of the phase shift between adjacent recorded pulses in the azimuth direction, as will be presently seen. The vertical segment "a" of the raster of FIGURE 2 comprises the recorded waveform of the received target information derived from the first transmitted pulse. Portions 100a and 104a are shown which correspond to signals 100 and 104, respectively, in FIGURE 3. It is noted that corresponding peaks and crests of the waveforms on the two adjacent azimuth lines in each portion are aligned. This is determined by the IF frequency being a multiple of the fast azimuth sweep frequency. In addition, since the spacing of the azimuth lines is less than the diameter of the electron beam spot, as previously mentioned, an overlapping of the waveforms on the two adjacent lines occurs. Thus, the actual recording on the photographic film, for example, appears as two or three spots of bright illumination for each IF target pulse, corresponding to the peaks of the IF waveform. The position of the portions 100a and 104a in the vertical direction represents the range of the respective targets. Although, for purposes of illustration, only two targets are depicted, in actual practice numerous targets at various ranges may be recorded.

In vertical segment "b" is recorded the received target information derived from the second transmitted pulse. The positioning of the beam onto the second vertical segment is controlled by the slow azimuth sweep, which in the operation being considered, is accomplished by advancing the film 5 a distance equal to the width of a vertical segment during the interpulse period. Since the frequency of the signals returned from fixed targets will be constant and since the IF signals are coherent, the phase of the waveform appearing in portion 101b, which corresponds to the signal 101 of FIGURE 2, is of the same phase as the waveform in portion 100a. However, the IF signals received from the moving target under consideration are shifted in frequency by one quarter of the transmitted PRF and appear in portion 105b shifted 90° in phase with respect to the waveform of portion 104a. Succeeding vertical segments of the film will have modulated thereon the received signals derived from succeeding transmitted pulses. Thus, at the various target range positions there are formed a succession of essentially continuous A.-C. waveforms.

The Doppler frequency target information contained in the recorded waveforms at the various ranges may be readily extracted by analyzing the frequency spectrum of these waveforms. In FIGURE 4 is illustrated a graph of the frequency spectrum of the waveforms that are being recorded. Conventionally this spectrum would be plotted with the frequency in cycles per second measured along the abscissa and the amplitude measured along the ordinate axis. Accordingly, peaks in the waveform would be expressive of frequency components present in maximum amplitudes. In the present graph, however, the recording is done in the space domain rather than the time domain, and while the maximum amplitudes do represent frequency components presents in maximum intensities, the frequencies are measured not in cycles per second but rather in cycles per unit length, said unit length being equal to the width of each segment of the rectangular raster of the recording.

The graph of FIGURE 4 will now be studied so as to better understand its significance. The envelope 110 of this freqency spectrum graph outlines the amplitude of the freqency components present in a single recorded alternating wave pulse having two and one half cycles within the pulse, said pulse being of a predetermined unit length. The frequency of the alternating waves within the pulse, which we may denote as F, is thus 2½ ~ per unit length. Envelope 110 is essentially a $$\frac{\sin x}{x}$$

function. It is seen that the graph has a major peak at 2½ ~ per unit length with minor peaks and null points displaced to either side so as to clearly define the frequency content of the pulse. Now consider a train of many of such two and one half cycles pulses being positioned adjacent to one another as in the recording of FIGURE 2, but with the cycles of successive pulses phased so as to form a continuous alternating wave. The frequency components of the train of pulses are reduced from those of a single pulse and include essentially single line frequencies centered about the F frequency, or 2½ ~ per unit length, and discrete frequencies displaced therefrom by integral values of the recorded pulse repetition frequency, which is 1∼ per unit length. However, since the envelope of the spectrum falls on nulls at points displaced 1∼ per unit length from the F frequency essentially only the F frequency is present in this latter waveform, as would be expected.

If the cycles within successive pulses are shifted in phase by a fixed amount, additional to that required to provide a continuous alternating wave, it may be shown that new frequency components are introduced in the frequency spectrum of the train of pulses, and the previous single line frequencies are shifted by an amount equal to said phase shift. Therefore, if the frequency within successive pulses of the 2½∼ pulse train is shifted in phase by one quarter of a cycle, the frequency components of the pulse train are present at 2¾∼ per unit length and at frequencies displaced from this point by integral values of the recorded pulse repetition frequency, e.g., 1¾, 3¾∼ per unit length, etc.

It may be seen that a succession of recorded pulses as above described may be likened to a succession of received pulses from a single target in the received RF or IF pulse train positioned adjacent one another, but where the recorded pulses are in the space domain and the received pulses are in the time domain. Thus, the Doppler frequency shift of the RF energy reflected from moving targets, which is contained in the phase of the IF energy within the received pulses, can be accurately obtained from an analysis of the frequency spectrum of the recorded pulses.

This can be shown by considering now specifically the recorded waveform in FIGURE 2 at the range of the fixed target. It may be seen that the phase of the sine waves of successive pulses is advanced by a half cycle at the end of the two and a half cycles of each vertical segment. This half cycle phase shift occurs because of the half cycle flyback time employed. Since a continuous sinusoidal wave across the vertical segments would be represented on the spectral analysis curve as a single line frequency at 2½∼ per unit length, it may be appreciated that the recorded waveform of the fixed target, which is shifted by ½∼ per unit length at the end of every vertical segment, has primary frequency components existing at 2∼ per unit length and 3∼ per unit length, indicated by the dotted vertical lines 111 and 112 in FIGURE 4, and secondary frequency components at points displaced by integrals of 1∼ per unit length from the primary frequency components, indicated by the dotted lines 113, 114 and 115. Since we know that the RF signals received from fixed targets are of constant frequency, these points are established as indicating a zero frequency shift of received target signals. For purposes of the invention, the useful range of the spectrum analysis may be considered to be between the primary frequency lines 111 and 112, since at frequencies outside of this range, the amplitudes of the frequency components are sharply diminished.

Consider now the recorded waveform in FIGURE 2 at the range of the moving target. It may be seen that in addition to the 180° phase shift contributed by the flyback time, an additional phase shift of 90° is applied to the alternating waves of successive pulses. Thus, in the spectrum of FIGURE 4, the predominant frequencies of the recorded waveform of the moving target occur at the primary frequency 2¼∼ per unit length, indicated by the solid line 116, and at secondary frequencies displaced by integrals of 1∼ per unit length from the primary frequency, indicated by solid lines 117, 118, 119, 120 and 121. We will consider only the useful primary frequency component of 2¼∼ per unit length. In view of what has been explained previously, this frequency may be readily interpreted as resulting from a phase shift of one quarter cycle of the IF between successive pulses of the moving target signals in the received pulse train, or more meaningful as a Doppler frequency shift of one quarter the transmitted PRF. If the transmitted PRF is assumed to be 1000∼/sec., the Doppler frequency shift is 250∼/sec. It may readily be seen that correspondingly a Doppler shift of 500∼/sec. would be indicated in the spectrum as a single frequency of 2½∼ per unit length, and a Doppler shift of 750∼/sec. would be indicated as 2¾∼ per unit length. Thus, Doppler frequency shifts up to 1000∼/sec., or the transmitted PRF, may be obtained from this form of spectrum of the received IF. This is two times the order of the frequency shift that can be recognized in the prior art recording of video signals. In video recordings, Doppler frequencies in excess of ½ PRF are reflected into the ½ PRF range whereas in applicant's IF recording system only frequencies exceeding 1 PRF are reflected. In addition, the sign of the Doppler shift, i.e., whether the Doppler frequency shift is added to or subtracted from the IF frequency, may be ascertained if the Doppler frequency is known to be within ½ PRF. This is determinable in video recordings only when the Doppler frequency is known to be within ¼ PRF.

It is recalled that a flyback time of one half cycle of the IF is employed. A flyback time of this order serves to minimize the effect of spurious responses due to nonlinearities of the system and the like. These spurious responses appear at integral values of the recorded pulse repetition frequency. By assigning a flyback time of one half cycle of the IF, the useful range of analysis is made to extend between integral values of the recorded pulse repetition frequency, specifically between 2 and 3∼ per unit length, so that these spurious responses do not appreciably affect the readings. Suppression of spurious responses may be accomplished in a similar manner by making the flyback time equal to any odd multiple of a half cycle of the IF. However, if it is desired to record the widest bandwidth possible, the flyback time should be minimized and for this reason a half cycle flyback is considered optimum. It is noted that it may be desirable for zero frequency shift instead of one half the transmitted PRF to be optimum, so that the frequency components of the fixed target recorded waveform fall at the peaks of the graph in FIGURE 4. This can be arranged by shifting the frequency of the reference local oscillator, which mixes with the RF received signal, by one half the transmitted PRF. In this manner, very slowly moving targets can be detected and their frequency components more readily analyzed.

Other spurious responses due to reflections, indicated by the lower dotted envelope 122 in FIGURE 4, may be reduced by increasing the number of cycles recorded per fast azimuth sweep. Since the use of more cycles is uneconomical from the standpoint of storage space requirements, a compromise is effected. Thus, if storage space is not at a premium, 2½ or more cycles per unit length may be used. If storage space is costly and if tolerances on the spurious components will permit, 1½ or even ½ cycle per unit length may be employed.

Referring now to FIGURE 5, there is illustrated another embodiment of applicant's recording apparatus in which the IF information is written by a velocity modulation technique, rather than by intensity modulation as in FIGURE 1. The circuit is similar to that of FIGURE 1 and includes many of the same components which are similarly designated but with an added prime notation.

In FIGURE 5, the IF signal from the IF amplifier stages of the receiver is added to the output of the range sweep amplifier circuit 18′ in an adding network 30, and the summation voltage from adding network 30 is coupled to the vertical deflecting electrodes 19′. Adding network 30 includes a pair of tuned parallel resonant circuits 31 and 32 which are tuned to pass a bandwidth centered on the IF of about two times the video signal frequency. Circuit 31 comprises a variable capacitor 33, resistor 34 and inductor 35 connected in parallel between a pair of junctions, one of said junctions being connected to the range sweep amplifier circuit 18' and the other junction being connected to one of the vertical deflecting electrodes 19'. Parallel resonant circuit 32 includes variable capacitor 36, resistor 37 and inductor 38 connected in parallel between a second pair of junctions, circuit 32 being inductively coupled to circuit 31. The IF signal is connected to one junction of circuit 32, the other of said junctions being connected to ground. The pulse generator 8' supplies a cut off voltage directly to the grid 16', and a fast azimuth sweep voltage through integrating circuit 20' to the horizontal deflecting electrodes 21'.

In the operation of the circuit of FIGURE 5, the beam is scanned slowly in the range direction and rapidly in the azimuth direction, as in FIGURE 1. However, now the IF signal information is applied by a velocity modulation of the beam under the control of the vertical deflecting electrodes 19'. Thus, the information appearing on the screen 2' and on the photographic film 5' is in the same form as the previous embodiment and may be illustrated by the graph of FIGURE 2.

In order to obtain a spectral analysis of the frequencies of the recorded waveforms contained in the photographic film 5, corresponding to the frequency spectrum graph of FIGURE 4, it is necessary to employ either electrical or optical readout means which may be of a conventional nature. In one form of conventional readout, illustrated in FIGURE 6, the light density modulations appearing on the film 5 are photographed by a television camera 50, shown in a plan view and including typically a Vidicon tube. The camera 50 scans the recorded waveforms in the horizontal direction and serves to transform the light energy obtained therefrom into electrical signals. Each frame of the film 5 may be assumed to contain 50 vertical columns similar to those of FIGURE 2, each column having 1000 horizontal lines, with the film being advanced in a series of steps by a conventional Geneva mechanism.

The electrical signals at the output of the camera 50, whose frequencies in cycles per second are dependent upon the readout scan speed, are passed through a bank of $n$ number of parallel connected bandpass filters of which 51A, 51B, 51C and 51n are shown. Each filter responds to a narrow frequency band within the useful range of analysis, said useful range corresponding to the recorded frequencies of between 2 and 3 cycles per unit length. Considering a readout time for each frame equal to the writing time and with two horizontal sweeps made per line, the useful frequency range of the output signal being coupled to the filters is between 4 and 6 mc. The number of filters employed should preferably be equal to the number of vertical columns, in this case 50, each having a bandwidth of 40 kilocycles. Thus, filter 51A has a frequency range of 4–4.04 mc., filter 51B a range of 4.04–4.08 mc., filter 51C a range of 4.08–4.12 mc. and filter 51n a range of 5.96–6 mc. The outputs of the filters are connected through an electronic sampling switch 52 to a range versus velocity display device 53. The electronic switch 52 is a conventional component comprising a series of diode gates and pulse generating circuits for selectively operating said diode gates, so that the filter outputs are successively sampled once per horizontal sweep readout. The recorded waveforms are thus subjected to an electrical analysis of their frequency components which appears on the display device 53.

In another known form of readout, an optical processing system may be employed to provide the frequency spectral analysis of the recorded waveforms contained in the photographic film. In an optical processing system a source of parallel light waves are transmitted through the density modulations on the film and are then focused by a focusing lens onto a screen. A diffraction pattern appears on the screen in accordance with the density modulations, from which the desired frequency information can be readily obtained. Optical processing permits a two dimensional readout operation, rather than one as in its electrical counterpart, and is thus more suited for great storage density media such as photographic film. A more detailed exposition of optical processing is presented in an article entitled "Data Processing By Optical Techniques," by L. J. Cutrona, E. N. Leith and L. J. Porcello, published in the 1959 Conference Proceedings of the National Convention On Military Electronics, and in an article entitled "Optical Data Processing and Filtering Systems," by C. J. Palermo, L. J. Cutrona, E. N. Leith and L. J. Porcello, published in the IRE Transactions on Information Theory, June 1960.

It is noted that a recording storage tube may be employed in lieu of the display tube and photographic film illustrated in FIGURES 1 and 5, wherein the received IF information signals are capacitively stored. A suitable recording storage tube is the QK 685, of Raytheon manufacture, which uses the principle of secondary-emission writing on a dielectric surface, and readout using the stored charge pattern to modulate the electron beam. When employing such storage tube, the external circuitry is the same as in FIGURES 1 and 5 except that the beam is controlled by a slow azimuth sweep in addition to the fast azimuth sweep. The slow azimuth sweep is in lieu of the previous film movement, and is provided by connecting to the horizontal deflection structure, in this instance magnetic, an additional sawtooth voltage of a relatively low frequency, e.g., $\frac{1}{50}$ of the transmitted PRF. Thus, the information is stored in the capacitive storage elements in vertical segments similar to the illustration in FIGURE 2. An electrical spectral analysis of the stored information is readily accomplished by a bank of filters, similar to those described with reference to FIGURE 6, the readout of the stored information providing a signal in suitable electrical form for use with said bank of filters.

The present invention also has application to the recording of information on a thermoplastic tape. For this form of recording, a cathode ray tube gun and deflection structure may be employed having characteristics similar to the tube 3 in FIGURES 1 and 5, so that the beam is deflected slowly in the range direction and rapidly in the azimuth direction. The thermoplastic tape is used as the writing surface, as well as providing the storage function. The thermoplastic tape and its transport mechanism are enclosed in an evacuated chamber common to said gun and deflection structure. The electron beam is caused to impinge upon the relatively slowly advanced thermoplastic tape so as to deform the thermoplastic medium in accordance with the signal information. The deformed medium may be read out and analyzed by an optical processing system in a fashion similar to that previously referred to with relation to the optical data processing articles. Alternatively the readout may be by means of an optical phase demodulation projection system and an electrical signal derived which can be analyzed as described with relation to FIGURE 6. A detailed description of the construction and techniques employed in thermoplastic recording appears in the aforementioned Glenn application for U.S. Letters Patent, Serial No. 8,842.

Although, for purposes of clarity, the invention has been described with relation to a number of specific embodiments, it is not to be construed as limited thereto. Thus, there will be readily apparent to those skilled in the art many modifications in structure and operation which do not depart from the principles of the invention. The appended claims are intended to embrace all such modifications which fall within the true spirit and scope of the invention.

What I claim as new and desire to secure by Letters Patent of the United States is:

1. A system for recording both the phase and amplitude of radar signals reflected from remote targets, said signals being in the form of repetitive randomly spaced high frequency alternating wave pulses, comprising means for writing the radar signals from a single transmitted pulse upon a first segment of a storage surface, one dimension of said segment corresponding to target range and a second orthogonal dimension of said segment corresponding to the time of occurrence of successive pulses, said means including a control means for writing the alternating component of each target pulse along said second dimension at its respective range coordinate, means for positioning the radar signals derived from succeeding transmitted pulses upon corresponding adjacent surface segments so that the alternating components of successive radar signals reflected from single targets are recorded in approximate alignment along the second dimension of adjacent segments at their respective target range coordinates, whereby the recorded signals may be readily read out so as to provide an indication of the Doppler frequency shift of said reflected radar signals by utilizing the phase relationship between aligned successive recorded pulses.

2. A system for recording both the phase and amplitude of radar signals reflected from remote targets, said signals being in the form of repetitive randomly spaced intermediate frequency alternating wave pulses, an electron beam generating means, means for modulating said electron beam with said intermediate frequency signals, a storage surface, scanning means for controlling the scansion of said beam relative to said storage surface so as to write said intermediate frequency signals upon said surface in rows aligned in adjacent columns, the dimension along said rows corresponding to the time of occurrence of successive pulses and the dimension along said columns corresponding to target range, said scanning means including means for writing the alternating component of each target pulse along said rows at its respective range coordinate, said columns containing the intermediate frequency pulse signals derived from a single transmitted pulse and said rows containing the successive intermediate frequency pulse signals received from single targets, the alternating components of said successive intermediate frequency pulse signals being approximately aligned in said rows at their target range coordinates, whereby the recorded signals may be readily read out so as to provide an indication of the Doppler frequency shift of said reflected radar signals by utilizing the phase relationship between aligned successive recorded pulses.

3. A system for recording both the phase and amplitude of radar signals reflected from remote targets, said signals being in the form of repetitive randomly spaced high frequency alternating wave pulses, having a predetermined pulse repetition frequency and a coherent phase relationship comprising means for writing the alternating components of the radar signals from a single transmitted pulse upon a first segment of a storage surface, one dimension of said segment corresponding to target range and a second orthogonal dimension of said segment corresponding to the time of occurrence of successive pulses, said writing means including means for scanning in said one dimension at a sweep frequency equal to said pulse repetition frequency and for scanning in said second dimension at a sweep frequency greater than said pulse repetition frequency and equal to a submultiple of said high frequency, the alternating component of each target pulse being written along said second dimension at its respective target range coordinate, means for positioning the radar signals derived from succeeding transmitted pulses upon corresponding adjacent surface segments at a rate related to said pulse repetition frequency so that the alternating components of successive radar signals reflected from single targets are recorded in approximate alignment along the second dimension of adjacent segments at their respective target range coordinates, whereby the recorded signals may be readily read out so as to provide an indication of the Doppler frequency shift of said reflected radar signals by utilizing the phase relationship between aligned successive recorded pulses.

4. A system for recording phase and amplitude information of radar signals reflected from remote targets, said signals being in the form of repetitive randomly spaced intermediate frequency alternating wave pulses having a predetermined pulse repetition frequency and a coherent phase relationship comprising an electron beam generating means for writing said information on a storage surface, means for modulating said electron beam with said intermediate frequency signals, said beam generating means having first deflecting means for sweeping said beam in a first direction corresponding to target range at a sweep frequency equal to said pulse repetition frequency, second deflecting means for sweeping said beam in a second orthogonal direction corresponding to the time of occurrence of successive pulses at a sweep frequency greater than said pulse repetition frequency and equal to a submultiple of said intermediate frequency, means for additionally displacing said beam in said second direction relative to said storage surface at a rate related to said pulse repetition frequency, said beam thereby forming parallel scanning lines on successive adjacent segments of said storage surface with the alternating component of each pulse superimposed thereon at its respective range position, the alternating components of successive pulses being written on said adjacent storage surface portions in approximate alignment, whereby the stored information may be readily read out so as to provide an indication of the Doppler frequency shift of said reflected radar signals by utilizing the phase relationship between aligned successive recorded pulses.

5. A recording system as in claim 4 wherein the sweep frequency of said second deflecting means is equal to one third said intermediate frequency and wherein each of said alternating wave pulses is written as a plurality of cycles of the alternating component on each of said storage surface segments.

6. A recording system as in claim 5 wherein said means for modulating the electron beam comprising means for applying said intermediate frequency signals to the control grid of said beam generating means so as to provide an intensity modulation of said beam.

7. A recording system as in claim 5 wherein said means for modulating the electron beam comprises means for applying said intermediate frequency signals to said first deflecting means so as to provide a velocity modulation of said beam.

8. A system for recording phase and amplitude information of radar signals reflected from remote targets, said signals being received in the form of repetitive randomly spaced radio frequency alternating wave pulses having a predetermined pulse repetition frequency comprising means for converting said signals into intermediate frequency pulses having a coherent phase relationship, an electron beam generating means for writing information on a storage medium, said beam generating means having a control electrode and a first and second pair of deflecting electrodes, first means for applying a first control voltage to said first pair of deflecting electrodes so as to sweep said beam in a first direction corresponding to target range at a sweep frequency equal to said pulse repetition frequency, second means for applying a second control voltage to said second pair of deflecting electrodes so as to rapidly sweep said beam in a second direction corresponding to the time of occurrence of successive pulses at a sweep frequency equal to a submultiple frequency of said intermediate frequency, means for additionally displacing said beam in said second direction relative to said storage medium at a rate related to said pulse repetition frequency, said beam thereby describing parallel scanning lines on successive adjacent segments of said storage medium, pulse generator means for generating a succession of narrow pulses at a frequency equal to said submultiple frequency, means for adding said narrow pulses to said intermediate frequency pulses, means for applying the output of said adding means to said control electrode to intensity modulate said electron beam, said narrow pulses having an amplitude sufficient to provide cut off of said beam during the flyback time of said rapid sweep, a plurality of cycles of the alternating wave component of each pulse being written by said beam upon the scanning lines of each segment at the respective range position, whereby the alternating wave components of successive pulses are written on said adjacent storage medium segments in approximate alignment so as to provide easy read out of Doppler frequency shift of said reflected radar signals by utilizing the phase relationship between aligned successive pulses.

9. A recording system as in claim 8 wherein said storage medium comprises a photographic film and said means for additionally displacing said beam comprises a transport means for advancing said film.

10. A system for recording phase and amplitude information of radar signals reflected from remote targets, said signals being received in the form of repetitive randomly spaced radio frequency alternating wave pulses having a predetermined pulse repetition frequency comprising means for converting said signals into intermediate frequency pulses having a coherent phase relationship, an electron beam generating means for writing information on a storage medium, said beam generating means having a control electrode and a first and second pair of deflecting electrodes, first means for applying a first control voltage to said first pair of deflecting electrodes so as to sweep said beam in a first direction corresponding to target range at a sweep frequency equal to said pulse repetition frequency, second means for applying a second control voltage to said second pair of deflecting electrodes so as to rapidly sweep said beam in a second direction corresponding to the time of occurrence of successive pulses at a sweep frequency equal to a submultiple frequency of said intermediate frequency, means for additionally displacing said beam in said second direction relative to said storage medium at a rate related to said pulse repetition frequency, said beam thereby describing parallel scanning lines on successive adjacent segments of said storage medium, pulse generator means for generating a succession of narrow pulses at a frequency equal to said submultiple frequency, means for applying said narrow pulses to said control electrode, said narrow pulses having an amplitude sufficient to provide cut off of said beam during the flyback time of said rapid sweep, means for applying said intermediate frequency pulses to said first pair of deflecting electrodes together with said first control voltage to velocity modulate said electron beam so as to write a plurality of cycles of the alternating wave component of each pulse upon the scanning lines of each segment at the respective range position, whereby the alternating wave components of successive pulses are written on said adjacent storage medium segments in approximate alignment so as to provide easy read out of Doppler frequency shift of said reflected radar signals by utilizing the phase relationship between aligned successive pulses.

11. A recording system as in claim 10 wherein said storage medium comprises a photographic film and said means for additionally displacing said beam comprises a transport means for advancing said film.

References Cited in the file of this patent

UNITED STATES PATENTS 2,972,142  Parkinson _____ Feb. 14, 1961

FOREIGN PATENTS 625,034  Great Britain _____ June 21, 1949